United States Patent
Stroia et al.

(10) Patent No.: US 7,836,687 B2
(45) Date of Patent: Nov. 23, 2010

(54) SOOT FILTER REGENERATION SOFTWARE, METHODS AND SYSTEMS

(75) Inventors: Bradlee J. Stroia, Columbus, IN (US); Wole Akinyemi, Clifton Park, NY (US)

(73) Assignee: Cummins Inc., Columbus, IN (US)

(*) Notice: Subject to any disclaimer, the term of this patent is extended or adjusted under 35 U.S.C. 154(b) by 248 days.

(21) Appl. No.: 12/004,447

(22) Filed: Dec. 20, 2007

(65) Prior Publication Data

US 2008/0196389 A1    Aug. 21, 2008

Related U.S. Application Data

(60) Provisional application No. 60/876,289, filed on Dec. 21, 2006.

(51) Int. Cl.
*F01N 3/00* (2006.01)

(52) U.S. Cl. .............. 60/295; 60/274; 60/297; 60/311

(58) Field of Classification Search .......... 60/274, 60/276, 295, 297, 301, 311
See application file for complete search history.

(56) References Cited

U.S. PATENT DOCUMENTS

| | | | |
|---|---|---|---|
| 4,471,611 A | 9/1984 | Watanabe | |
| 4,715,179 A | 12/1987 | Muller et al. | |
| 5,063,736 A | 11/1991 | Hough et al. | |
| 5,746,989 A | 5/1998 | Murachi et al. | |
| 5,974,791 A * | 11/1999 | Hirota et al. | 60/276 |
| 6,167,696 B1 | 1/2001 | Maaseidvaag et al. | |
| 6,598,387 B2 * | 7/2003 | Carberry et al. | 60/297 |
| 6,666,019 B2 * | 12/2003 | Kawatani et al. | 60/286 |
| 6,711,892 B2 | 3/2004 | Tamura et al. | |
| 6,735,941 B2 * | 5/2004 | Saito et al. | 60/295 |
| 6,829,890 B2 * | 12/2004 | Gui et al. | 60/295 |
| 6,854,265 B2 | 2/2005 | Saito et al. | |
| 6,947,831 B2 | 9/2005 | van Nieuwstadt | |
| 6,951,100 B2 | 10/2005 | Kuboshima et al. | |
| 6,983,591 B2 * | 1/2006 | Kondo et al. | 60/295 |
| 6,990,801 B2 | 1/2006 | Kitahara | |
| 7,007,462 B2 | 3/2006 | Kitahara | |
| 7,007,463 B2 | 3/2006 | Shirakawa | |
| 7,031,827 B2 | 4/2006 | Trudell et al. | |
| 7,043,903 B2 | 5/2006 | Onodera et al. | |
| 7,065,960 B2 | 6/2006 | Gioannini et al. | |

(Continued)

FOREIGN PATENT DOCUMENTS

EP    1400673 A2    3/2004

(Continued)

OTHER PUBLICATIONS

ISR(PCT/US07/26045), Jul. 3, 2008, Cummins, Inc.

*Primary Examiner*—Thomas E Denion
*Assistant Examiner*—Diem Tran
(74) *Attorney, Agent, or Firm*—Krieg DeVault LLP; J. Bruce Schelkopf, Esq.

(57) ABSTRACT

One embodiment is a method including maintaining a count based upon an engine operating condition, determining a soot level based upon a characteristic of a diesel particulate filter, and requesting deSoot based upon the count meeting or exceeding a threshold, or the soot level meeting or exceeding a threshold, or both. Further embodiments, forms, objects, features, advantages, aspects, and benefits shall become apparent from the following description and drawings.

32 Claims, 3 Drawing Sheets

U.S. PATENT DOCUMENTS

| | | |
|---|---|---|
| 7,104,050 B2 | 9/2006 | Sato et al. |
| 7,240,483 B2 | 7/2007 | Cizeron et al. |
| 2002/0078681 A1 | 6/2002 | Carberry et al. |
| 2003/0115854 A1 | 6/2003 | Tamura et al. |
| 2003/0131592 A1 | 7/2003 | Saito et al. |
| 2004/0093854 A1 | 5/2004 | Oakes et al. |
| 2004/0200271 A1 | 10/2004 | van Nieuwstadt |
| 2004/0204818 A1 | 10/2004 | Trudell et al. |
| 2005/0022512 A1 | 2/2005 | Shirakawa |
| 2005/0039439 A1 | 2/2005 | Kitahara |
| 2005/0039443 A1 | 2/2005 | Kitahara |
| 2005/0039444 A1 | 2/2005 | Nishizawa et al. |
| 2005/0137776 A1 | 6/2005 | Gioannini et al. |
| 2005/0154523 A1 | 7/2005 | Yahata et al. |
| 2005/0188681 A1 | 9/2005 | Emi et al. |
| 2005/0217252 A1 | 10/2005 | Sato et al. |
| 2005/0217253 A1 | 10/2005 | Onodera et al. |
| 2006/0021331 A1 | 2/2006 | Cizeron et al. |
| 2006/0137327 A1 | 6/2006 | Shirakawa et al. |
| 2006/0179822 A1 | 8/2006 | Dalla Betta |
| 2006/0242945 A1 | 11/2006 | Wang et al. |
| 2006/0254262 A1 | 11/2006 | Chiba et al. |
| 2006/0260298 A1 | 11/2006 | Iida |
| 2007/0000520 A1 | 1/2007 | Steen et al. |
| 2007/0143865 A1 | 6/2007 | McGrath et al. |

FOREIGN PATENT DOCUMENTS

| | | |
|---|---|---|
| EP | 1722088 A2 | 11/2006 |
| EP | 1726807 A1 | 11/2006 |

\* cited by examiner

US 7,836,687 B2

SOOT FILTER REGENERATION SOFTWARE, METHODS AND SYSTEMS

PRIORITY

The benefits and rights of priority of U.S. Patent Application No. 60/876,289 filed Dec. 21, 2006 are claimed and that application is incorporated by reference.

BACKGROUND

Internal combustion engines including diesel engines produce a number of combustion products including particulates, hydrocarbons ("HC"), carbon monoxide ("CO"), oxides of nitrogen ("NOx"), oxides of sulfur ("SOx") and others. Diesel particulate filters, such as catalyzed soot filters, close coupled catalysts and others can be used to trap particulates and reduce emissions from diesel exhaust. Such filters may undergo regeneration, or deSoot, to eliminate trapped diesel particulates. If a filter is allowed to load too much soot before regeneration, risks including filter overloading, uncontrolled regeneration, and filter failure may result. If soot regeneration occurs too frequently, unnecessarily thermal cycling and increased fuel penalty may result. There is a need for the unique and inventive soot filter regeneration software, systems, and methods disclosed herein.

SUMMARY

One embodiment is a method including maintaining a count based upon an engine operating condition, determining a soot level based upon a characteristic of a diesel particulate filter, and requesting deSoot based upon the count meeting or exceeding a threshold, or the soot level meeting or exceeding a threshold, or both. Further embodiments, forms, objects, features, advantages, aspects, and benefits shall become apparent from the following description and drawings.

DETAILED DESCRIPTION

Figure 1:
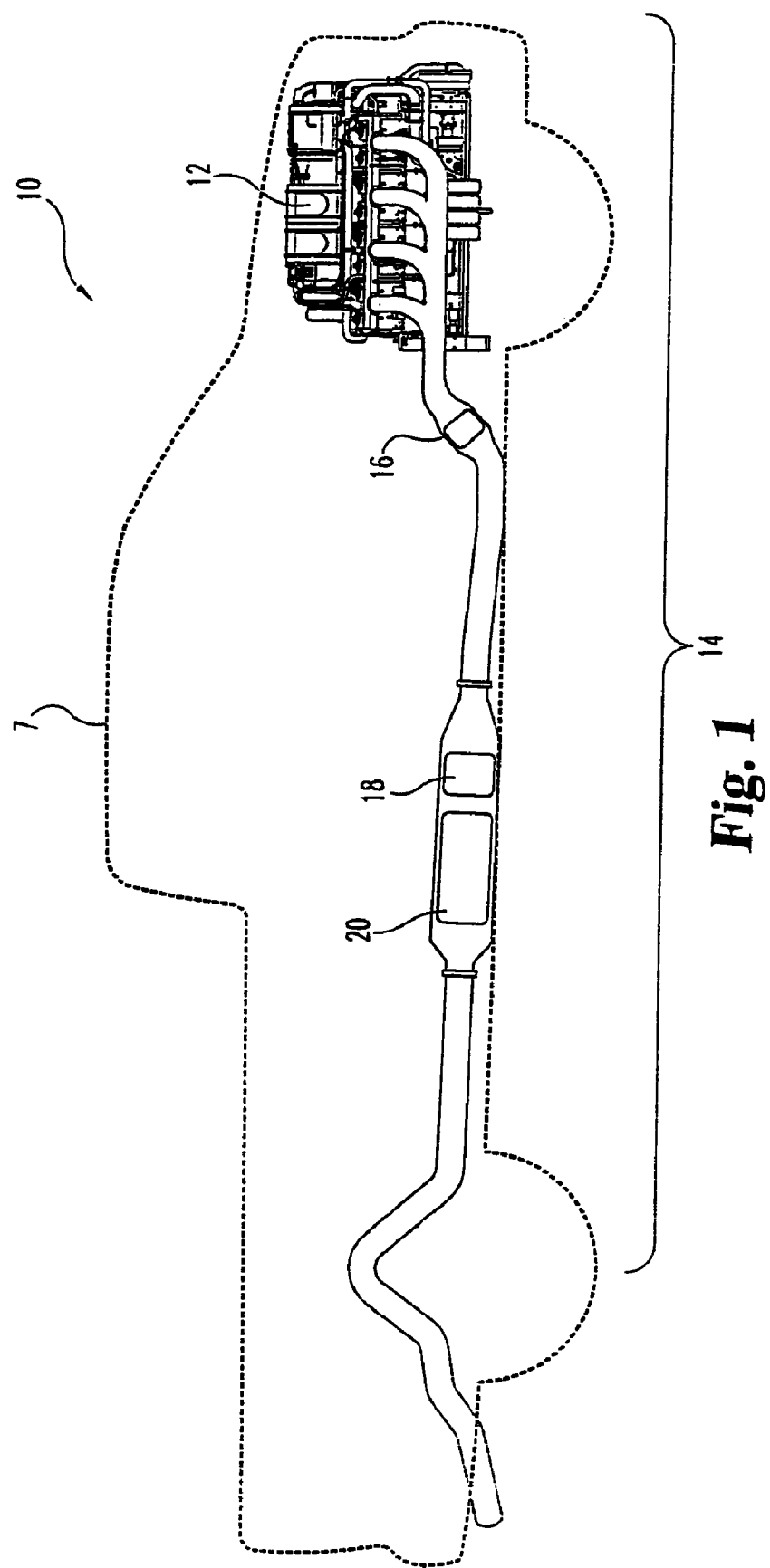
FIG. 1 is a schematic of an integrated engine-exhaust aftertreatment system provided in a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

With reference to FIG. 1, there is illustrated a schematic of a preferred integrated engine-exhaust aftertreatment system 10 provided in a vehicle 7. The aftertreatment subsystem 14 includes a diesel oxidation catalyst 16 which is preferably a close coupled catalyst but could be other types of catalyst units such as a semi-close coupled catalyst, a NOx adsorber or lean NOx trap 18, and a diesel particulate filter 20 which are coupled in flow series to receive and treat exhaust output from engine 12.

The diesel oxidation catalyst unit 16 is preferably a flow through device that includes a honey-comb like substrate. The substrate has a surface area that includes a catalyst. As exhaust gas from the engine 12 traverses the catalyst, CO, gaseous HC and liquid HC (unburned fuel and oil) can be oxidized. During operation, the diesel oxidation catalyst unit 16 is heated to a desired temperature.

The adsorber 18 is preferably a NOx adsorber operable to adsorb NOx and SOx emitted from engine 12 to reduce their emission into the atmosphere. The NOx adsorber 18 preferably includes catalyst sites which catalyze oxidation reactions and storage sites which store compounds. After NOx adsorber 18 reaches a certain storage capacity it can be regenerated through deNOx and/or deSOx processes. Other embodiments contemplate use of different NOx aftertreatment devices, for example, a converter such as a saline NOx catalyst.

The diesel particulate filter 20 is preferably a catalyzed soot filter, but may include one or more of several types of filters. The diesel particulate filter 20 can be utilized to capture diesel particulate matter from the flow of exhaust gas exiting the engine 12. Diesel particulate matter includes submicron size particles found in diesel exhaust, including both solid and liquid particles, and may be classified into several fractions including: inorganic carbon (soot), organic fraction (often referred to as SOF or VOF), and sulfate fraction (hydrated sulfuric acid). The regeneration of diesel particulate filter 20 is referred to as deSoot or soot regeneration and may include oxidation of some or all of the trapped fractions of diesel particulate matter. The diesel particulate filter 20 preferably includes at least one catalyst to catalyze the oxidation of trapped particulate.

Figure 2:
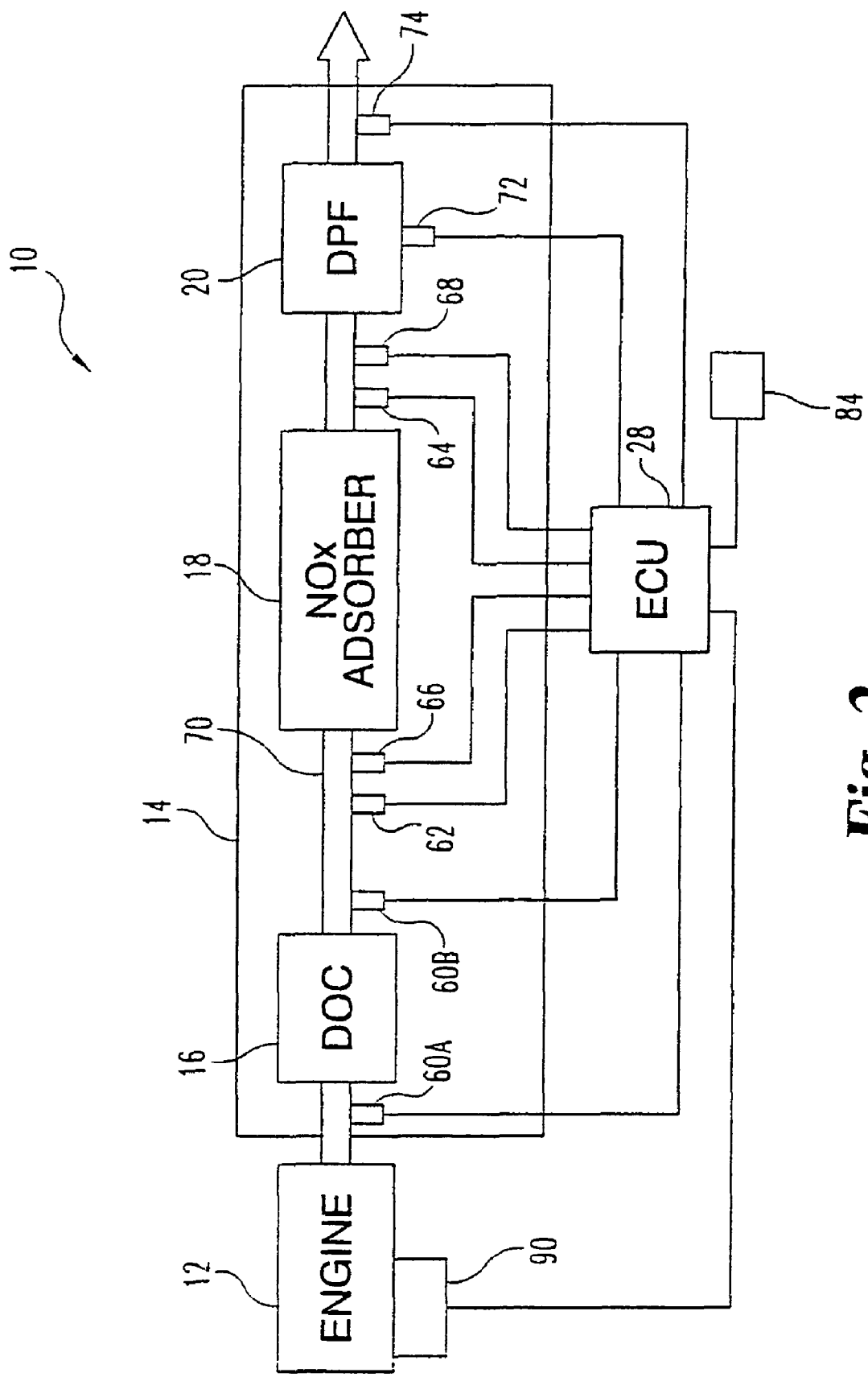
FIG. 2 is a schematic of an integrated engine-exhaust aftertreatment system operatively coupled with an engine control unit.

With reference to FIG. 2, there is illustrated a schematic of integrated engine-exhaust aftertreatment system 10 operatively coupled with an engine control unit ("ECU") 28. At least one temperature sensor 60 is connected with the diesel oxidation catalyst unit 16 for measuring the temperature of the exhaust gas as it enters the diesel oxidation catalyst unit 16. In other embodiments, two temperature sensors 60 are used, one at the entrance or upstream from the diesel oxidation catalyst unit 16 and another at the exit or downstream from the diesel oxidation catalyst unit 16. Information from temperature sensor(s) 60 is provided to ECU 28 and used to calculate the temperature of the diesel oxidation catalyst unit 16.

A first NOx temperature sensor 62 senses the temperature of flow entering or upstream of NOx adsorber 18 and provides a signal to ECU 28. A second NOx temperature sensor 64 senses the temperature of flow exiting or downstream of NOx adsorber 18 and provides a signal to ECU 28. NOx temperature sensors 62 and 64 are used to monitor the temperature of the flow of gas entering and exiting the NOx adsorber 18 and provide signals that are indicative of the temperature of the flow of exhaust gas to the ECU 28. An algorithm may then be used by the ECU 28 to determine the operating temperature of the NOx adsorber 18.

A first oxygen sensor 66 is positioned in fluid communication with the flow of exhaust gas entering or upstream from the NOx adsorber 18 and a second oxygen sensor 68 is positioned in fluid communication with the flow of exhaust gas exiting or downstream of the NOx adsorber 18. Oxygen sensors are preferably universal exhaust gas oxygen sensors or lambda sensors, but could be any type of oxygen sensor. The oxygen sensors 66 and 68 are connected with the ECU 28 and provide electric signals that are indicative of the amount of oxygen contained in the flow of exhaust gas. The oxygen sensors 66 and 68 allow the ECU 28 to accurately monitor air-fuel ratios also over a wide range thereby allowing the ECU 28 to determine a lambda value associated with the exhaust gas entering and exiting the NOx adsorber 18.

Engine 12 includes a fuel injection system 90 that is operatively coupled to, and controlled by, the ECU 28. Fuel injection system 90 delivers fuel into the cylinders of the engine 12. Various types of fuel injection systems may be utilized in the present invention, including, but not limited to, pump-line-nozzle injection systems, unit injector and unit pump systems, high pressure common rail fuel injection systems, common rail fuel injection systems and others. The timing of the fuel injection, the amount of fuel injected, the number and timing of injection pulses, are preferably controlled by fuel injection system 90 and/or ECU 28.

Figure 3:
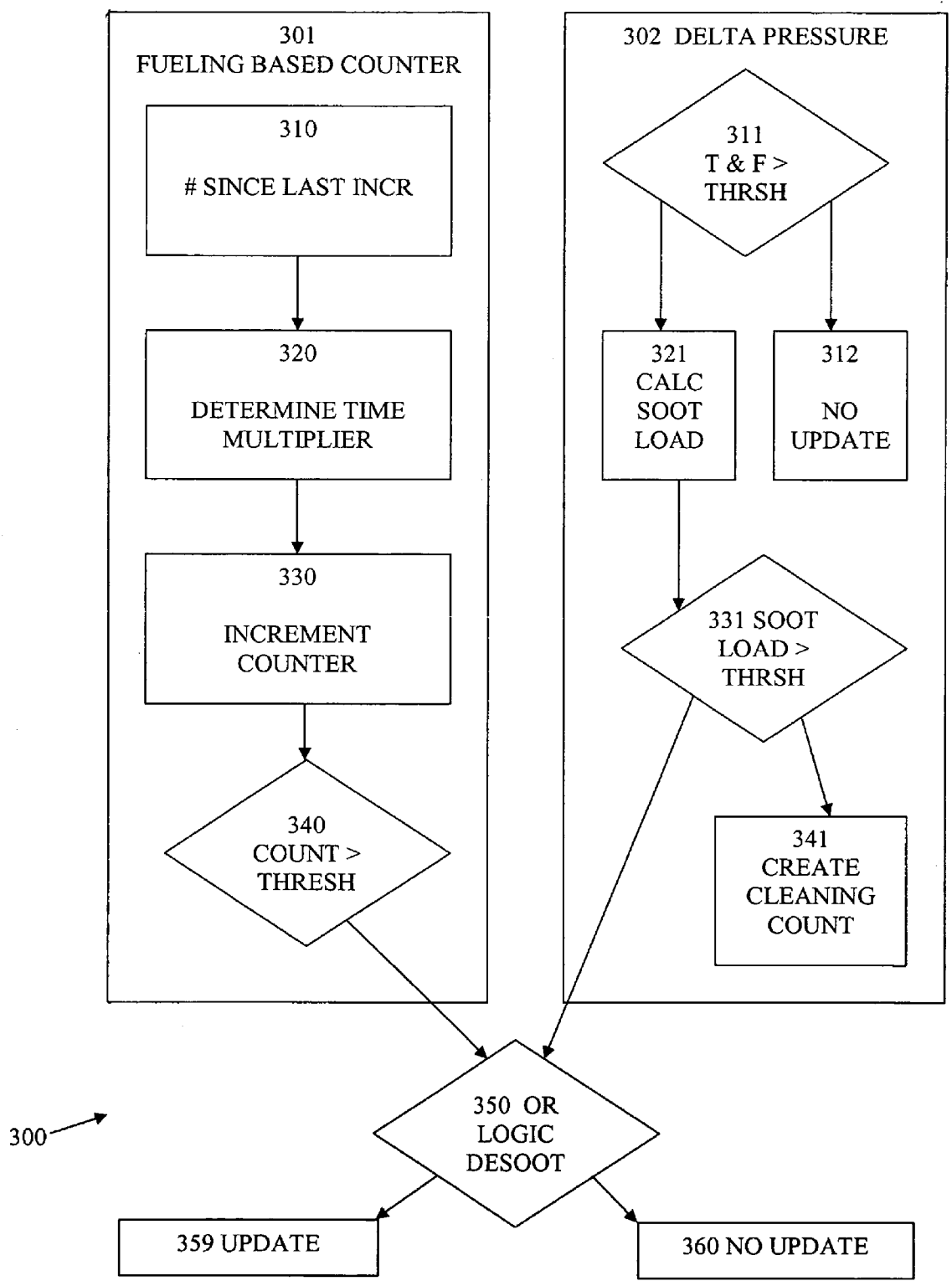
FIG. 3 is a schematic of a preferred deSoot triggering control diagram.

With reference to FIG. 3, there is illustrated a diagram 300 of a preferred deSoot triggering control which may be implemented as software, hardware or a combination thereof, and may be executed by an ECU, such as ECU 28, or by another controller. Diagram 300 includes a fueling block 301 and a delta pressure block 302. The output of fueling block 301 and the output of delta pressure block 302 are provided to conditional 350. Conditional 350 is a Boolean OR operator which requests a deSoot operation when one or more of its inputs is true. The deSoot operation can be requested or commanded by using a deSoot request variable or flag 370. If the output of conditional 350 is false, there will be no deSoot request as indicated by block 360. It is also contemplated that additional inputs and logic networks may be connected to conditional 350, for example, an enable or override input or logic network.

Fueling based block 301 includes block 310 which determines time since the last increment. The output of block 310 is provided to block 320 which determines a time multiplier based on an engine operating condition, for example, fueling. The output of block 320 is provided to block 330 which adds a new count to a counter. The counter will count (e.g., increment or decrement) at a base rate if the engine is in a first operation mode where the key switch on, and engine speed meets or exceeds a threshold. If the engine becomes air limited or is deNOx mode, then the counter will count at a faster rate than base rate to account for increased soot production during rich NOx regeneration. The counter will also count at an increased rate during rich SOx regeneration mode, which can account for the soot rate of production during deSOx regeneration. The counter value of block 330 is provided to conditional 340, for example, by continuous, periodic, intermittent, or other types of interrogation of the counter value. Conditional 340 tests whether the counter count exceeds (or meets or exceeds) a threshold. The output of conditional 340 is provided to conditional 350 which can request or command deSoot as described above.

Delta pressure based block 302 includes conditional 311 which tests whether engine temperature exceeds (or meets or exceeds) an engine temperature threshold, and tests whether air flow exceeds (or meets or exceeds) an air flow threshold. If both thresholds have been exceeded (or met or exceeded) conditional 311 outputs true to block 321. If one or both thresholds have not been exceeded (or met or exceeded) conditional 311 outputs false to block 312. Block 321 calculates a soot level load based upon a pressure differential across a diesel particulate filter, or based upon an airflow rate across or through a diesel particulate filter, or preferably based upon both a pressure differential across a diesel particulate filter and an airflow rate across or through the filter or based upon combinations of these and other criteria. Block 321 provides the calculated soot level load to conditional 331 which tests whether the soot level load exceeds (or meets or exceeds) a soot level load threshold. The output of conditional 331 is provided to conditional 350 which can request deSoot as described above. The output of conditional 331 is also provided to block 341 which creates or maintains a count for soot filter cleaning.

As is evident from the figures and text presented above, a variety of embodiments according to the present invention are contemplated. Certain exemplary embodiments include a method comprising maintaining a count based upon an engine operating condition; determining a soot level based upon a characteristic of a diesel particulate filter; requesting deSoot based upon the count meeting or exceeding a threshold, or the soot level meeting or exceeding a threshold, or both. In further exemplary embodiments the determining a soot level based upon a characteristic of a diesel particulate filter includes determining a soot level based upon a pressure differential across a diesel particulate filter; the determining a soot level based upon a characteristic of a diesel particulate filter includes determining a soot level based upon an airflow rate across or through a diesel particulate filter; the determining a soot level based upon a characteristic of a diesel particulate filter includes determining a soot level based upon a pressure differential across the diesel particulate filter and an airflow rate of the diesel particulate filter; the maintaining a count based upon an engine operating condition includes incrementing or decrementing the count at a first rate if the engine speed exceeds a first threshold; the maintaining a count based upon an engine operating condition includes incrementing or decrementing the count at an increased rate if engine operation becomes air limited; the maintaining a count based upon an engine operating condition includes incrementing or decrementing the count at an increased rate if the engine is operating in a deNOx mode; the maintaining a count based upon an engine operating condition includes incrementing or decrementing the count at an increased rate if the engine is operating in a deSOx mode; and/or the maintaining a count based upon an engine operating condition includes incrementing or decrementing the count at a first rate if the engine speed exceeds a first threshold incrementing or decrementing the count at an increased rate if engine operation becomes air limited, the engine is operating in a deNOx mode, or the engine is operating in a deSOx mode. Further exemplary embodiments include determining if engine temperature meets or exceeds a threshold, or engine air flow meets or exceeds a threshold, or both; wherein said determining a soot level occurs only if engine temperature meets or exceeds a threshold, or engine air flow meets or exceeds a threshold, or both.

Certain exemplary embodiments include a system comprising a diesel particulate filter; a pressure sensor operable to sense a pressure of the diesel particulate filter; a processor operable to receive information of the pressure sensor; and a flow sensor operable to sense a flow of the diesel particulate filter; wherein the processor is operable to perform a first evaluation of a count and a count threshold, to perform a second evaluation of a soot load and a soot load threshold, and to instruct deSoot based upon the first evaluation or the second evaluation. In further exemplary embodiments the pressure sensor is operable to sense a pressure differential across the diesel particulate filter; the diesel particulate filter is a catalyzed soot filter; and/or the processor is a component of an ECU. Further exemplary embodiments include a diesel engine wherein the ECU is operatively coupled to the diesel engine; and/or a vehicle wherein the diesel engine is operatively coupled to the vehicle.

Certain exemplary embodiments include one or more computer readable media configured to store instructions to maintain a count, to store sensor information, and to command deSoot when a counter condition is satisfied or a sensor information condition is satisfied or both. Further exemplary embodiments include one or more computer readable media provided in an ECU. In further exemplary embodiments the counter condition includes a count exceeding a count threshold; and/or the sensor information condition includes delta pressure information and an air flow rate information.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    maintaining a count based upon an engine operating condition, wherein the maintaining a count based upon an engine operating condition includes incrementing or decrementing the count at a first rate if the engine speed exceeds a first threshold;
    determining a soot level based upon a characteristic of a diesel particulate filter;
    requesting deSoot based upon the count meeting or exceeding a threshold, or the soot level meeting or exceeding a threshold, or both.

2. A method according to claim 1 wherein the determining a soot level based upon a characteristic of a diesel particulate filter includes determining a soot level based upon a pressure differential across a diesel particulate filter.

3. A method according to claim 1 wherein the determining a soot level based upon a characteristic of a diesel particulate filter includes determining a soot level based upon an airflow rate across or through a diesel particulate filter.

4. A method according to claim 1 wherein the determining a soot level based upon a characteristic of a diesel particulate filter includes determining a soot level based upon a pressure differential across the diesel particulate filter and an airflow rate of the diesel particulate filter.

5. A method according to claim 1 wherein the maintaining a count based upon an engine operating condition further includes incrementing or decrementing the count at an increased rate if engine operation becomes air limited, the engine is operating in a deNOx mode, or the engine is operating in a deSOx mode.

6. A method according to claim 1 further comprising determining if engine temperature meets or exceeds a threshold, or engine air flow meets or exceeds a threshold, or both; wherein said determining a soot level occurs only if engine temperature meets or exceeds a threshold, or engine air flow meets or exceeds a threshold, or both.

7. A system comprising:
    a diesel particulate filter treating an exhaust of an engine;
    a pressure sensor operable to sense a pressure of the diesel particulate filter;
    a processor operable to receive information of the pressure sensor; and
    a flow sensor operable to sense a flow of the diesel particulate filter; wherein
    the processor is operable to perform a first evaluation of a count and a count threshold, to perform a second evaluation of a soot load and a soot load threshold, and to instruct deSoot based upon the first evaluation or the second evaluation; and
    wherein the processor is further operable to perform the first evaluation of the count by incrementing or decrementing the count at a first rate if an engine speed exceeds a first threshold.

8. A system according to claim 7 wherein the pressure sensor is operable to sense a pressure differential across the diesel particulate filter.

9. A system according to claim 7 wherein the diesel particulate filter is a catalyzed soot filter.

10. The system according to claim 7, wherein the processor is further operable to perform the first evaluation of the count by incrementing or decrementing the count at an increased rate if an engine operation becomes air limited.

11. The system according to claim 7, wherein the processor is further operable to perform the first evaluation of the count by incrementing or decrementing the count at an increased rate if the engine is operating in a deNOx mode.

12. The system according to claim 7, wherein the processor is further operable to perform the first evaluation of the count by incrementing or decrementing the count at an increased rate if the engine is operating in a deSOx mode.

13. The system according to claim 7, wherein the processor is further operable to perform the first evaluation of the count by incrementing or decrementing the count at an increased rate if engine operation becomes air limited, the engine is operating in a deNOx mode, or the engine is operating in a deSOx mode.

14. A system according to claim 7 wherein the processor is a component of an engine control unit (ECU).

15. A system according to claim 14 wherein the engine is a diesel engine wherein the ECU is operatively coupled to the diesel engine.

16. A system according to claim 15 further comprising a vehicle wherein the diesel engine is operatively coupled to the vehicle.

17. A method comprising:
    maintaining a count based upon an engine operating condition, wherein the maintaining a count based upon an engine operating condition includes incrementing or decrementing the count at an increased rate if engine operation becomes air limited;
    determining a soot level based upon a characteristic of a diesel particulate filter;
    requesting deSoot based upon the count meeting or exceeding a threshold, or the soot level meeting or exceeding a threshold, or both.

18. A method according to claim 17 wherein the determining a soot level based upon a characteristic of a diesel particulate filter includes determining a soot level based upon a pressure differential across a diesel particulate filter.

19. A method according to claim 17 wherein the determining a soot level based upon a characteristic of a diesel particulate filter includes determining a soot level based upon an airflow rate across or through a diesel particulate filter.

20. A method according to claim 17 wherein the determining a soot level based upon a characteristic of a diesel particulate filter includes determining a soot level based upon a pressure differential across the diesel particulate filter and an airflow rate of the diesel particulate filter.

21. A method according to claim 17 wherein the maintaining a count based upon an engine operating condition includes incrementing or decrementing the count at a first rate if the engine speed exceeds a first threshold.

22. A method according to claim 17 further comprising determining if engine temperature meets or exceeds a threshold, or engine air flow meets or exceeds a threshold, or both; wherein said determining a soot level occurs only if engine temperature meets or exceeds a threshold, or engine air flow meets or exceeds a threshold, or both.

23. A method comprising:
   maintaining a count based upon an engine operating condition, wherein the maintaining a count based upon an engine operating condition includes incrementing or decrementing the count at an increased rate if the engine is operating in a deNOx mode;
   determining a soot level based upon a characteristic of a diesel particulate filter;
   requesting deSoot based upon the count meeting or exceeding a threshold, or the soot level meeting or exceeding a threshold, or both.

24. A method according to claim 23 wherein the determining a soot level based upon a characteristic of a diesel particulate filter includes determining a soot level based upon a pressure differential across a diesel particulate filter.

25. A method according to claim 23 wherein the determining a soot level based upon a characteristic of a diesel particulate filter includes determining a soot level based upon an airflow rate across or through a diesel particulate filter.

26. A method according to claim 23 wherein the determining a soot level based upon a characteristic of a diesel particulate filter includes determining a soot level based upon a pressure differential across the diesel particulate filter and an airflow rate of the diesel particulate filter.

27. A method according to claim 23 further comprising determining if engine temperature meets or exceeds a threshold, or engine air flow meets or exceeds a threshold, or both; wherein said determining a soot level occurs only if engine temperature meets or exceeds a threshold, or engine air flow meets or exceeds a threshold, or both.

28. A method comprising:
   maintaining a count based upon an engine operating condition, wherein the maintaining a count based upon an engine operating condition includes incrementing or decrementing the count at an increased rate if the engine is operating in a deSOx mode;
   determining a soot level based upon a characteristic of a diesel particulate filter; and
   requesting deSoot based upon the count meeting or exceeding a threshold, or the soot level meeting or exceeding a threshold, or both.

29. A method according to claim 28 wherein the determining a soot level based upon a characteristic of a diesel particulate filter includes determining a soot level based upon a pressure differential across a diesel particulate filter.

30. A method according to claim 28 wherein the determining a soot level based upon a characteristic of a diesel particulate filter includes determining a soot level based upon an airflow rate across or through a diesel particulate filter.

31. A method according to claim 28 wherein the determining a soot level based upon a characteristic of a diesel particulate filter includes determining a soot level based upon a pressure differential across the diesel particulate filter and an airflow rate of the diesel particulate filter.

32. A method according to claim 28 further comprising determining if engine temperature meets or exceeds a threshold, or engine air flow meets or exceeds a threshold, or both; wherein said determining a soot level occurs only if engine temperature meets or exceeds a threshold, or engine air flow meets or exceeds a threshold, or both.

* * * * *